United States Patent
Ma (10) Patent No.: US 9,840,374 B2
(45) Date of Patent: Dec. 12, 2017

(54) SELF-BIASING SCRAPER FOR A CONVEYOR BELT

(71) Applicant: Laitram, L.L.C., Harahan, LA (US)

(72) Inventor: Ruizhe Ma, Grand Rapids, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/182,832

(22) Filed: Jun. 15, 2016

(65) Prior Publication Data

US 2016/0376108 A1  Dec. 29, 2016

Related U.S. Application Data (60) Provisional application No. 62/185,845, filed on Jun. 29, 2015.

(51) Int. Cl.
*B65G 45/16* (2006.01)

(52) U.S. Cl.
CPC .................. *B65G 45/16* (2013.01)

(58) Field of Classification Search
CPC .................................................. B65G 45/16
USPC .................................................. 198/497, 499
See application file for complete search history.

(56) References Cited

U.S. PATENT DOCUMENTS

| | | | | |
|---|---|---|---|---|
| 3,722,667 A * | 3/1973 | Olson | ............... | B65G 45/16 198/499 |
| 4,269,301 A * | 5/1981 | Gibbs | ............... | B65G 45/16 198/499 |
| 4,402,394 A * | 9/1983 | Stoll | ............... | B65G 45/16 198/499 |
| 4,953,689 A * | 9/1990 | Peterson | ............... | B65G 45/16 15/256.51 |
| 4,969,553 A * | 11/1990 | Stoll | ............... | B65G 45/16 198/499 |
| 5,016,746 A * | 5/1991 | Gibbs | ............... | B65G 45/24 15/256.51 |
| 5,518,107 A * | 5/1996 | Schwarze | ............... | B65G 45/16 198/499 |
| 5,887,702 A * | 3/1999 | Mott | ............... | B65G 45/16 198/499 |
| 5,950,803 A * | 9/1999 | Schwarze | ............... | B65G 45/16 198/497 |
| 6,076,656 A * | 6/2000 | Mat | ............... | B65G 45/16 198/499 |
| 7,819,237 B2 * | 10/2010 | Felton | ............... | B65G 45/16 198/499 |
| 7,987,966 B2 * | 8/2011 | DeVries | ............... | B65G 45/16 198/497 |
| 8,776,990 B2 * | 7/2014 | Felton | ............... | B65G 45/16 198/499 |

(Continued)

OTHER PUBLICATIONS

International Search Report and Written Opinion of the International Searching Authority, PCT/US2016/037507, dated Sep. 28, 2016, Korean Intellectual Property Office, Daejeon, Republic of Korea.

*Primary Examiner* — Douglas Hess
(74) *Attorney, Agent, or Firm* — Catherine M. Bishop (57) ABSTRACT

A self-biasing conveyor belt scraper for a conveyor belt trained around a sprocket includes a base mounted on a shaft below the sprocket and a tapering scraper tip extending from the base. The top of the base contacts the conveyor belt at a first location. The conveyor belt pushes against the top of the base to bias the tapering scraper tip into contact with the conveyor belt at a second location.

19 Claims, 8 Drawing Sheets

(56) References Cited

U.S. PATENT DOCUMENTS

| | | | |
|---|---|---|---|
| 8,869,970 B2 | 10/2014 | Favre | |
| 8,881,889 B2 * | 11/2014 | Puchalla | B65G 45/16 198/499 |
| 9,145,266 B2 | 9/2015 | Roy | |
| 9,296,565 B2 * | 3/2016 | Batchelder | B65G 15/62 |
| 9,340,366 B2 * | 5/2016 | Peterson | B23K 26/38 |
| 9,517,493 B2 * | 12/2016 | Schwarze | B08B 1/005 |
| 2006/0049023 A1 | 3/2006 | Dietsch et al. | |
| 2006/0131136 A1 | 6/2006 | Smith et al. | |
| 2007/0179002 A1 | 8/2007 | DeGroot | |
| 2013/0264173 A1 | 10/2013 | Felton et al. | |
| 2015/0210475 A1 * | 7/2015 | Batchelder et al. | |
| 2017/0158434 A1 * | 6/2017 | Fourney et al. | |

* cited by examiner

SELF-BIASING SCRAPER FOR A CONVEYOR BELT

RELATED APPLICATIONS

The present application claims priority to U.S. Provisional Patent Application No. 62/185,845, filed Jun. 29, 2015 and entitled "Self-Biasing Scraper for a Conveyor Belt", the contents of which are herein incorporated by reference.

BACKGROUND

The invention relates generally a belt scraper for cleaning a conveyor belt.

Conveyor belt systems typically include a cleaning system for removing debris and other materials from the outer surface of the conveyor belt. For example, scraper blades in contact with the belt surface may be used to remove material deposits from the belt surface. A typical scraper has a metallic or flexible plastic, e.g., polyurethane, body that is mounted on a support shaft that spans a conveyor belt and that usually includes a spring-based tensioner that biases the scraper into engagement with the conveyor belt to allow them to scrape leavings off of the belt and yet resiliently shift away from the belt when surface irregularities on the belt are encountered. For a positively-driven, low-tension conveyor belt such as the ThermoDrive® belt available from Intralox, L.L.C., a separate position limiter system is usually required in the vicinity of the cleaning system for proper belt function, increasing the number of components required in the limited space surrounding the conveyor.

SUMMARY

The present invention provides a self-biasing conveyor belt scraper for removing debris and other materials from the outer surface of the conveyor belt, which also functions as a position limiter at the same time when used with a positively driven, low tension conveyor belt. The self-biasing scraper includes a base that contacts the conveyor belt at a first location and a tapering scraper tip extending from the base for contacting the conveyor belt in a second location. When the conveyor belt runs, the conveyor belt pushes against the base to bias the tapering scraper tip into contact with the conveyor belt.

According to one aspect, a scraper for a conveyor belt comprises a base and a tapering scraper tip. The base includes an opening for receiving a shaft and having an upper surface for contacting the conveyor belt in a first location. The tapering scraper tip extends from the base and contacts the conveyor belt in a second location.

According to another aspect, a conveyor comprises a conveyor belt trained around at least a first reversing element and a second reversing element, a shaft mounted below the second reversing element, and a self-biasing scraper mounted on the shaft. The self-biasing scraper comprises a base having an outer surface and a tapering scraper tip extending from the base. The outer surface contacts the outer side of the conveyor belt at a first location and the tapering scraper tip contacts the outer side of the conveyor belt at a second location.

According to another aspect, a method of scraping debris from a conveyor belt trained around a reversing element comprises the steps of mounting self-biasing scraper to a shaft disposed below the reversing element such that a base of the self-biasing scraper contacts the conveyor belt in a first location and driving the conveyor belt such that the conveyor belt pushes against the base of the self-biasing scraper in the first location to push a tip of the self-biasing scraper into contact with the conveyor belt at a second location.

BRIEF DESCRIPTION OF THE DRAWINGS

These features and aspects of the invention, as well as its advantages, are described in more detail in the following description, appended claims, and accompanying drawings, in which:

DETAILED DESCRIPTION

The present invention provides a self-biasing conveyor belt scraper for removing product and-or debris from a conveyor belt. The invention will be described relative to certain illustrative embodiments, though the invention is not limited to the embodiments described herein.

Figure 1A:
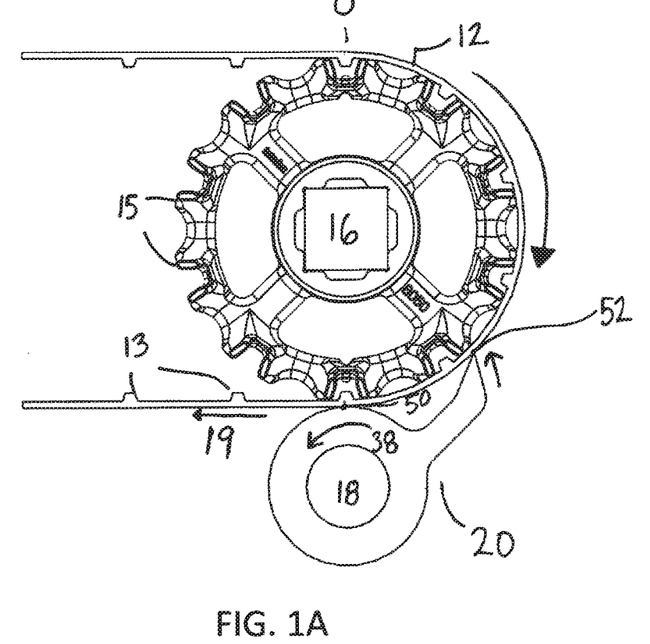
FIG. 1A is a side view of an end of a conveyor including a self-biasing scraper according to an embodiment of the invention.
Figure 1B:
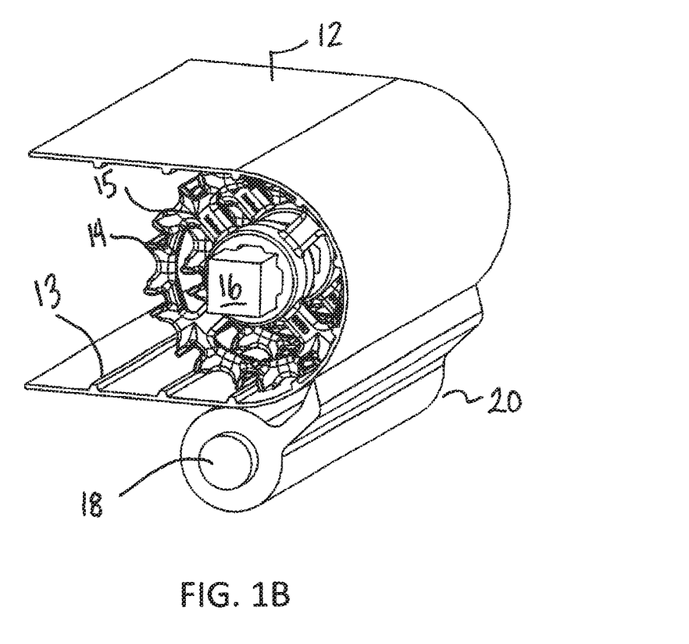
FIG. 1B is an isometric view of the conveyor end of FIG. 1A.

FIGS. 1A and 1B show a discharge end of a conveyor belt 12 trained around a reversing element, shown as a sprocket 14. The reversing element can be any suitable belt-guiding member, including a roller. The illustrative conveyor belt 12 comprises a positively-driven, low tension conveyor belt, such as the ThermoDrive® belt available from Intralox, L.L.C., the Cleandrive positive drive belt available from Habasit AG, the Gates Mectrol PosiClean® positive drive belt available from Gates Mectrol, the Volta SuperDrive™ and other positive drive belts available from Volta Belting and other positively-driven, low tension conveyor belts known in the art. The invention is not limited to these belts, and may be implemented with any suitable positive-drive, low tension conveyor belt as well as any tensioned flat belt. The illustrative conveyor belt has a smooth outer surface substantially free of discontinuities and an inner surface with a plurality of drive elements, shown as teeth 13, at a given belt pitch. The conveyor belt 12 conveys products along a carryway and returns along a returnway below the carryway. The illustrative sprocket 14 comprises a plurality of drive elements, shown as teeth 15, for engaging drive elements 13 on the conveyor belt 12. The sprocket 14 is mounted on a rotatable shaft 16. The sprocket 14 may be a drive sprocket or an idle sprocket. Other suitable means for driving the belt may be used. As product approaches the end of the carryway, the conveyor belt 12 reverses direction, guided by the sprocket 14.

Figures 2A, 2B:
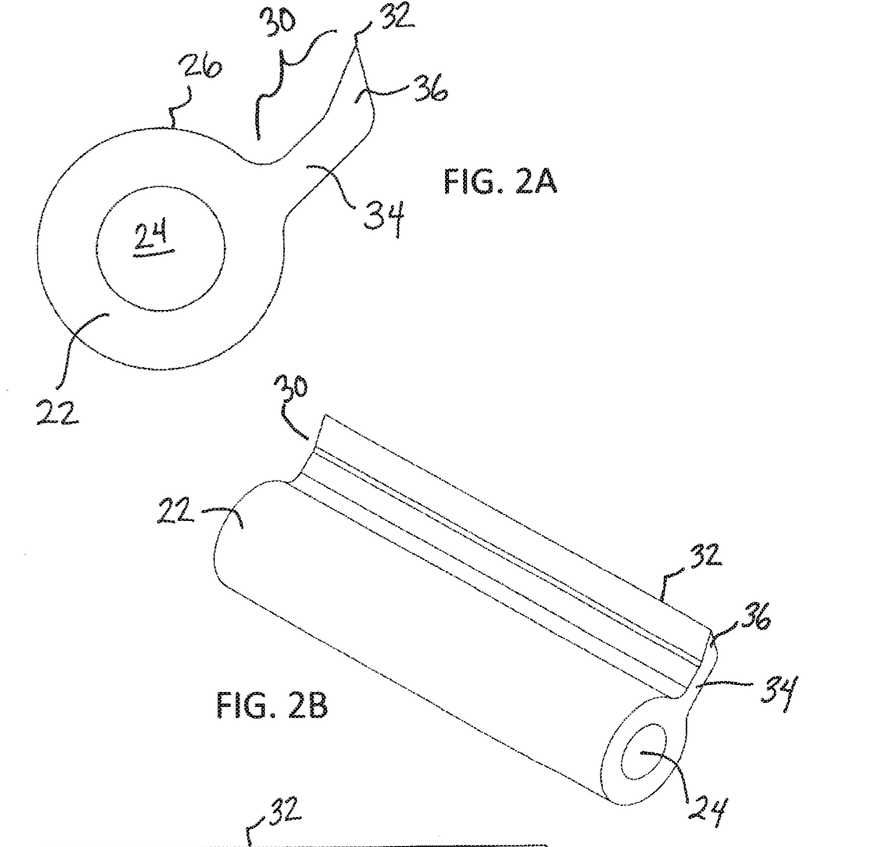
FIG. 2A is a side view of the self-biasing scraper of FIG. 1A.
FIG. 2B is an isometric view of the self-biasing scraper of FIG. 1A.
Figure 2C:
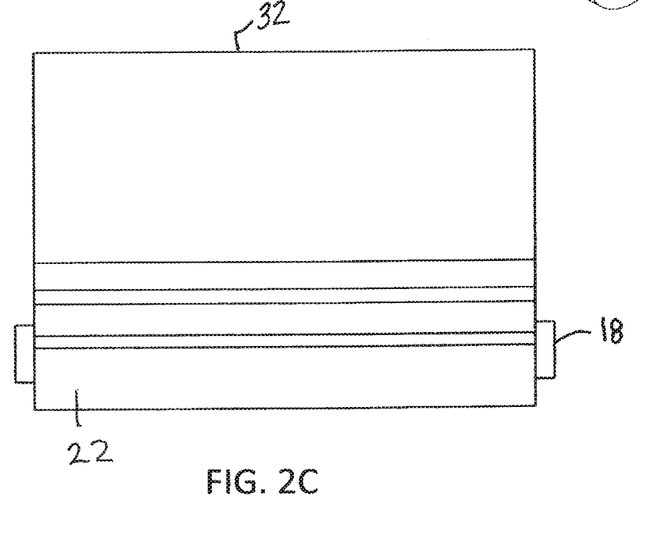
FIG. 2C is a top view of the self-biasing scraper of FIG. 1A.

A self-biasing scraper 20 is biased into contact with the conveyor belt 12. The scraper 20 removes material from the outer surface of the conveyor belt as the belt moves over the sprocket or other belt guiding member. The self-biasing scraper 20 is mounted on a shaft 18 below the sprocket 14. Referring to FIGS. 2A-2C, the self-biasing scraper 20 comprises a base 22 having a central opening 24 for receiving the shaft 18. The illustrative base 22 is cylindrical or tubular, though the invention is not so limited. Alternatively, the base can be open and clamp onto the shaft 18 as in FIGS. 9A-9B. The base 22 forms a top surface 26 that contacts the conveyor belt outer surface at bottom location 50, which is shown as 180° from the top (0°) of the sprocket, though the invention is not limited to be positioned at this location. In one embodiment, the top surface 26 is formed by a protrusion, bulge or other feature on the base 22 and can be concave, convex, or other complex geometries deemed appropriate.

A tapering scraper tip 30 extends from the base 22. The tapering scraper tip forms a scraping edge 32 that contacts the outer surface of the conveyor belt 12 at a second location 52 to scrap away product and debris. The illustrative second location 52 is about 135° from the top of the sprocket, though the invention is not so limited and the second point of contact can be any suitable location on the belt. The tip 30 includes a bar portion 34 extending at an angle from the base 22 towards the front of the sprocket 14. The illustrative bar portion has a substantially consistent cross-section, though the invention is not so limited. The illustrative bar portion 34 extends perpendicular to the base 22, but the invention is not so limited, and the angle of the bar portion relative to the base can be any suitable angle. The end 36 of the bar portion 34 bends slightly upwards and tapers to form the scraping edge 32. The illustrative scraping edge is linear, though alternatively, the scraping edge can be nonlinear.

Referring back to FIG. 1A, the self-biasing scraper 20 is mounted on the shaft 18 so that the top surface 26 contacts the outer surface of the conveyor belt 12 at location 50. As the conveyor belt 12 moves in direction 19, the contact between the outer surface of the conveyor belt 12 and the top surface 26 causes the base 22 to rotate on the shaft 18 in direction 38, which pushes the scraping edge 32 into contact with the outer surface of the conveyor belt at the second location 52. As the scraper tip wears out, the scraper 20 self-adjusts to maintain contact with the conveyor belt outer surface at location 52. The drag by the belt sliding over the base 22 provides uniform tension, ensuring that the scraper tip 32 conforms to the belt surface for better scraping performance.

The illustrative scraper tip 30 is integral with the base 22, but the invention is not so limited, and the scraper tip or a portion thereof may be removable and—or replaceable. The scraper tip 30 may also or alternatively be formed of a different material than the base, or coated in a different material to optimize scraping.

The base portion 22 may function as a position limiter to ensure engagement of a driven tooth with a sprocket. Position limiters, such as described in U.S. Pat. No. 7,850,562, the contents of which are incorporated herein by reference, may be used in low tension, positive drive belting systems to ensure proper engagement of the belt and drive sprocket by controlling the position of the belt during the drive tooth hand-off process. Preferably, the sprocket effectively drives only one tooth of the sprocket at a time, except for the duration in which a leading driven tooth disengages from the sprocket and hands off to the immediately trailing tooth as the trailing tooth becomes the leading driven tooth. The use of a position limiter helps control this handoff by ensuring of proper engagement between the belt and corresponding sprocket. The base portion 22 is placed a select distance away from the sprocket 14 to force the driven tooth into the sprocket pocket and into engagement with the driver elements of the sprocket.

In one embodiment, the position of the shaft 18 may be variable to ensure proper engagement and positioning of the self-biasing scraper 20.

The self-biasing scraper 20 is not limited to a round base as shown. The base portion 22 may have any suitable size, shape, position or configuration to ensure engagement of the drive belt with the sprocket and proper contact between the scraper tip and belt when the belt is moving.

Figures 3A, 3B, 3C:
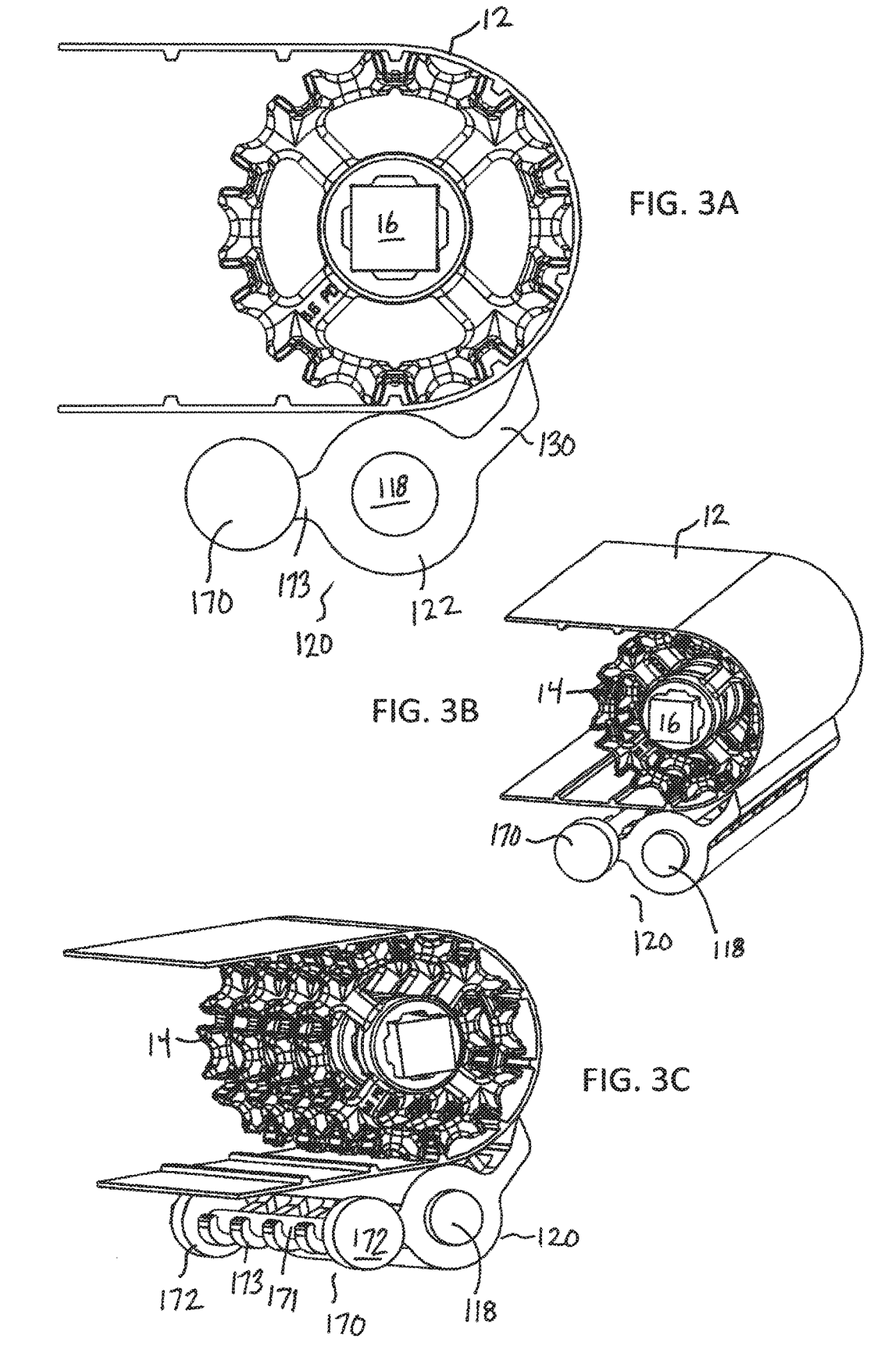
FIG. 3A is a side view of an end of a conveyor including a self-biasing scraper including a counter weight according to another embodiment of the invention.
FIG. 3B is an isometric view of the conveyor end of FIG. 3A.
FIG. 3C is another view of the conveyor end of FIG. 3A.
Figure 4A:
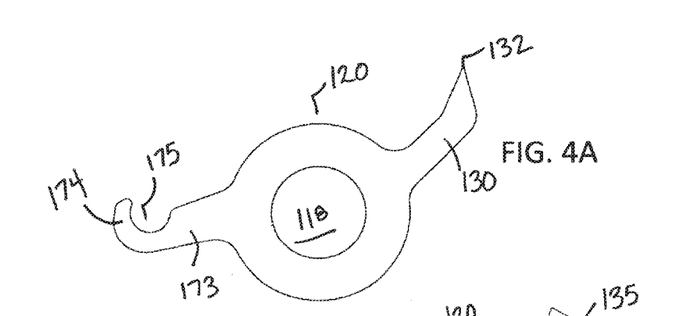
FIG. 4A is a side view of the self-biasing scraper of FIG. 3A.
Figures 4B, 5:
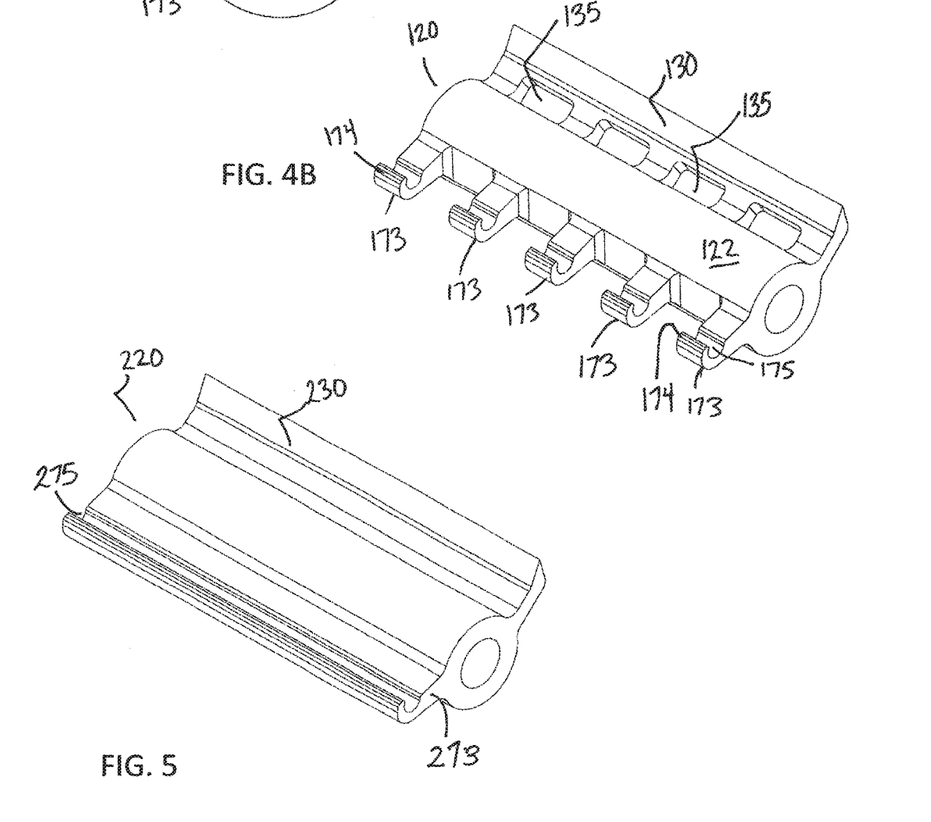
FIG. 4B is a top isometric view of the self-biasing scraper of FIG. 3A
FIG. 5 shows another embodiment of a self-biasing scraper including a channel for receiving a counter weight.

Referring to FIGS. 3A-3C, in one embodiment, a self-biasing scraper 120 may include a counter weight 170 for increased tensioning of the scraper tip. The illustrative counter weight 170 comprises a central bar 171 and end discs 172. The scraper 120 includes arms 173 extending from the base 122 substantially opposite the tapering scraper blade tip 130 for receiving the central bar 171. As shown in FIGS. 4A and 4B, the arms 173 include rounded tips 174 forming channels 175 for seating the counter weight central bar 171. Arms 173 and the scraper blade tip 130 form a lever system pivoting about the shaft 118, where the weight of the counter weight 170 is transmitted through the arms 173 and the tip 130 to the edge 132 to increase the pressure between the scraper edge 132 and the belt for improved scraping performance. The illustrative arms 173 take the shape of bars, but the invention is not so limited and arms 173 can be any shape and dimensions to take the advantage of a lever system.

The self-biasing scraper in FIGS. 4A and 4B also includes cut outs 135 in the scraper tip 130 to facilitate cleaning and—or to make the scraper tip 130 lighter.

In the illustrative embodiment, the scraper tip 130 and arms 173 are slightly less than 180° apart, but the invention is not limited to the illustrated orientation.

In another embodiment, shown in FIG. 5, a self-biasing scraper 220 with a tapering scraper tip 230 may include a single, solid arm 273 forming a continuous channel 275 for receiving a counter weight.

Figure 6A:
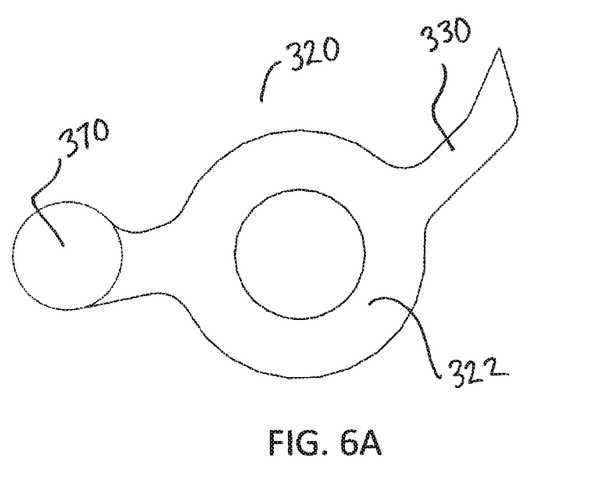
FIG. 6A is a side view of another embodiment of a self-biasing scraper including an integral counter weight.
Figure 6B:
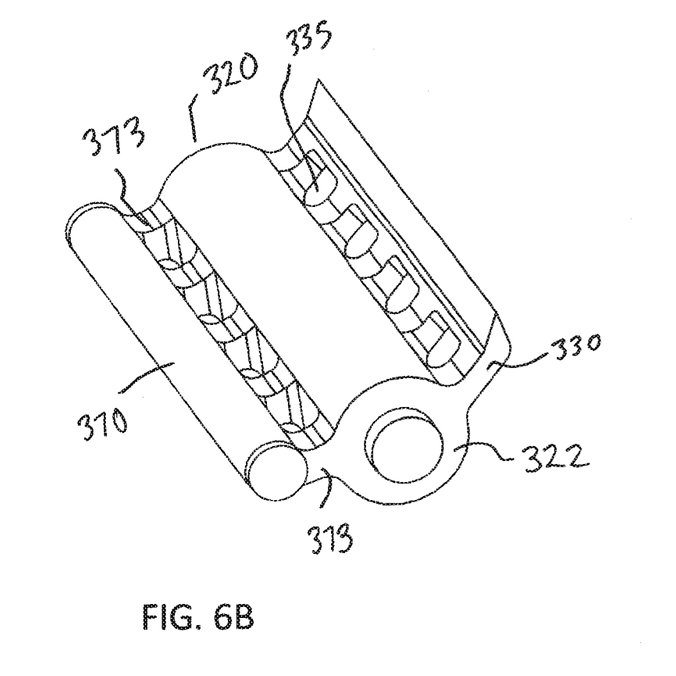
FIG. 6B is an isometric view of the self-biasing scraper of FIG. 6A.
Figures 7A, 7B, 8A:
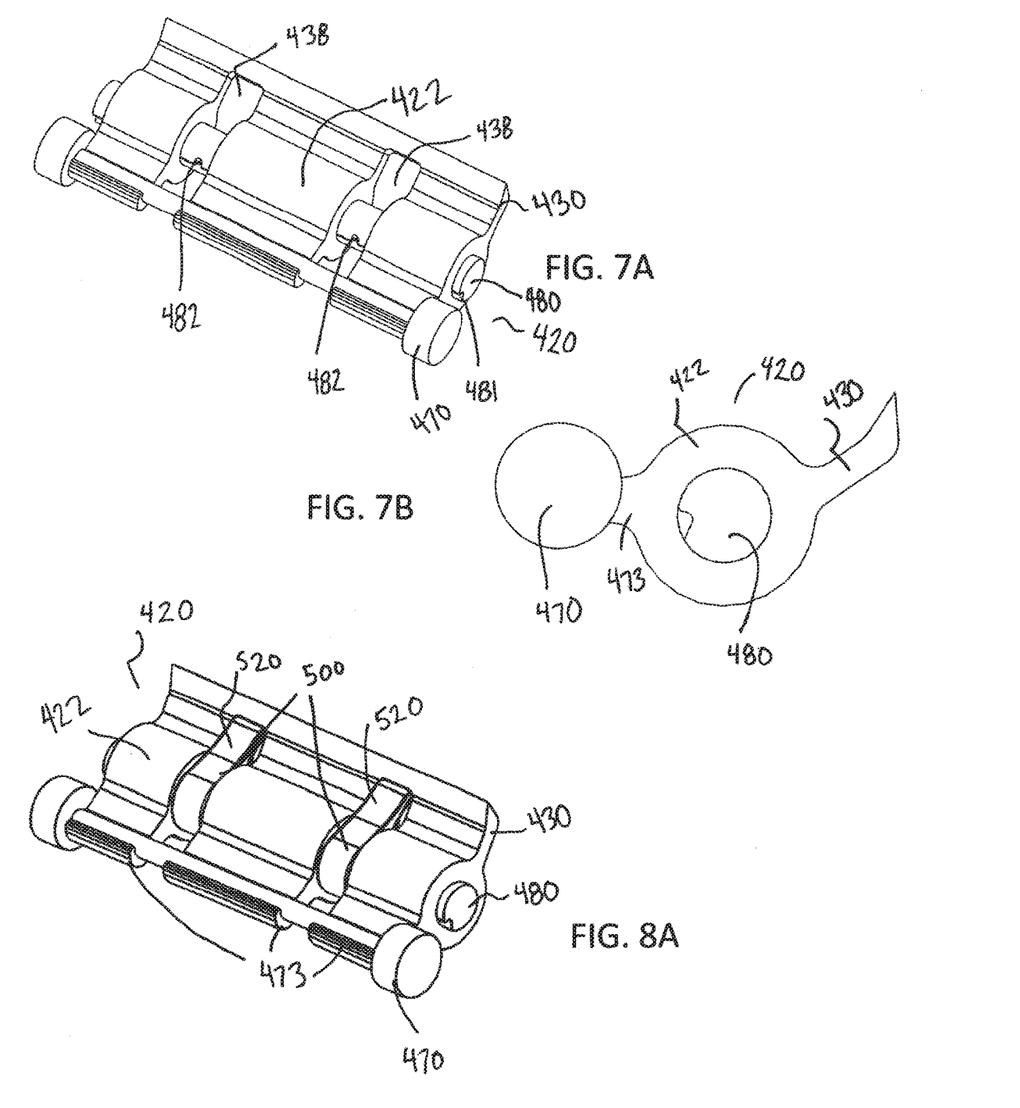
FIG. 7A is an isometric view of a self-biasing scraper including openings for receiving position limiters according to another embodiment of the invention.
FIG. 7B is a side view of the self-biasing scraper of FIG. 7A.
FIG. 8A shows the self-biasing scraper of FIGS. 7A and 7B with assembled position limiters.

In another embodiment, shown in FIGS. 6A and 6B, a self-biasing scraper 320 with a tapering scraper tip 330 may include an integral counter weight 370. The counter weight 370 can be a solid plastic bar connected to the scraper base 322 by arms 373. Alternatively, the counter weight 370 may have inserted rods made from materials such as stainless steel that are not visible from the outside. The illustrative counter weight 370 has the shape of a bar, though the invention is not so limited and the counter weight 370 can be any shapes and may be made from the same or different materials as the base 322. In the illustrative embodiment, the scraper tip 330 and the counter weight 370 are slightly less than 180° apart, but the invention is not so limited.

Referring to FIGS. 7A-8D, in another embodiment of the invention, a self-biasing scraper 420 may be designed to receive snap-on position limiters. The self-biasing scraper 420 is mounted on a longitudinal mounting bar 480 within the base portion 422. The longitudinal mounting bar 480 has a longitudinal channel 481 on an outer surface and notches 482. A tapering scraper tip 430 extends from the base portion 422. The scraper 420 further includes arms 473 for holding a counter weight 470, which may alternatively be integrally formed with the rest of the scraper. The scraper tip 430 includes openings 438 exposing the bar 480. A plurality of snap-on position limiters 500 may be mounted to the scraper 420. Examples of snap-on position limiters are described in U.S. Pat. No. 9,296,565, entitled "Snap-On Position Limiter for a Conveyor Belt", the contents of which are herein incorporated by reference. The invention is not limited to those described position limiters and the self-biasing scraper may be designed to accommodate any suitable auxiliary component in a conveyor. The illustrative position limiters 500 comprise a limiting surface 520 facing the conveyor belt for ensuring proper engagement of the sprocket and conveyor belt. The base of the position limiter forms a snap clamp for engaging the bar 480. Each position limiter 500 fits into an opening 438 to snap onto the mounting bar 480. The illustrative mounting bar 480 includes a longitudinal channel 481 and notches 482 for engaging corresponding features on the position limiter snap clamp. FIG. 8B is a bottom view of the self-biasing scraper 420, with the position limiters 500 snapped into place. FIG. 8C is a side view of the self-biasing scraper 420, with position limiters 500 snapped into place.

Figure 8B:
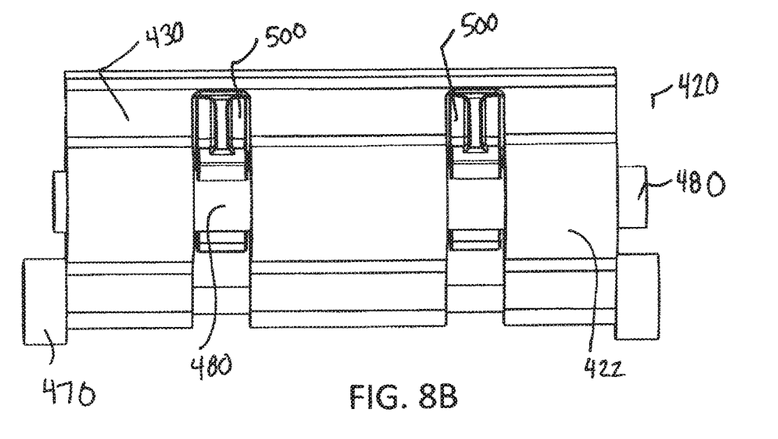
FIG. 8B is a bottom view of the self-biasing scraper of FIG. 8A.
Figure 8C:
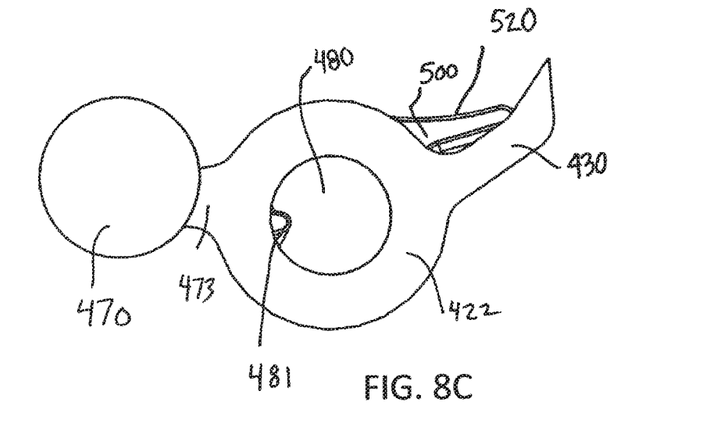
FIG. 8C is a side view of the self-biasing scraper of FIG. 8A.
Figure 8D:
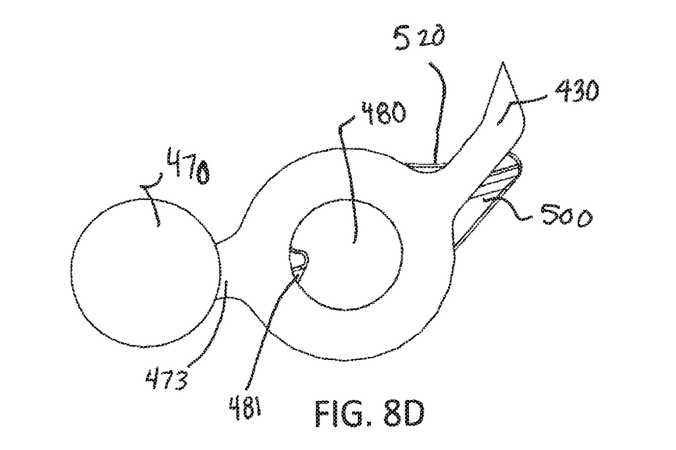
FIG. 8D is a side view of the self-biasing scraper of FIG. 8A with the scraper rotated on the shaft without interference with the position limiters.

The scraper 420 can rotate freely about the shaft 480 without interfering with the limiter 500, as shown in FIG. 8D.

Figure 9A:
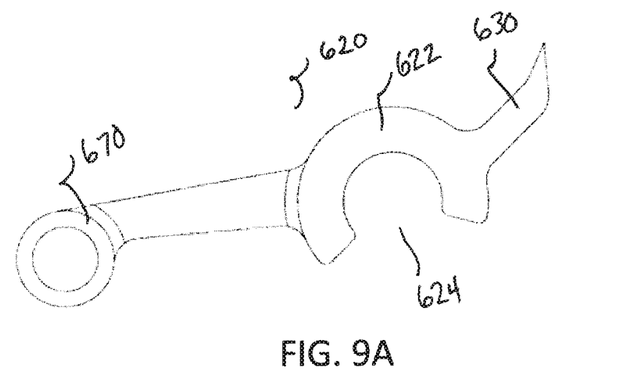
FIG. 9A is a side view of another embodiment of a self-biasing scraper.
Figure 9B:
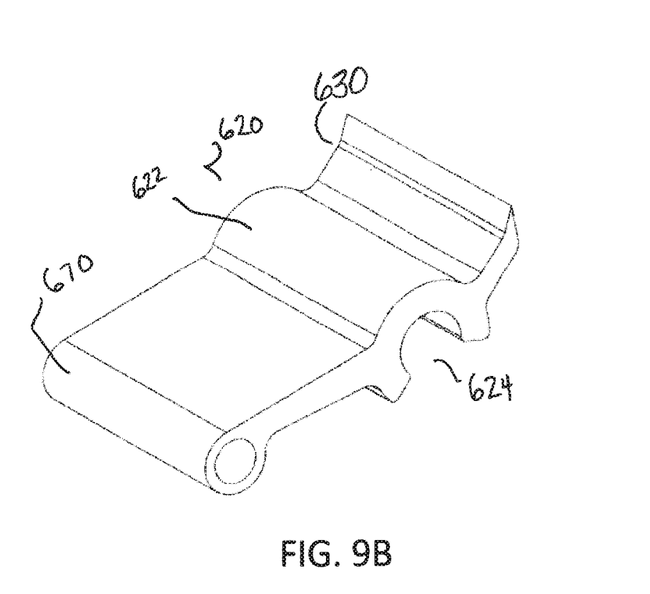
FIG. 9B is an isometric view of the self-biasing scraper of FIG. 9A.

FIGS. 9A and 9B show another embodiment of a self-biasing scraper 620 including a tapering scraper tip 630 and an integral counter weight 670 extending from a base 622. As shown in FIGS. 9A and 9B, the base 622 can be an open segment of a tube that can receive a mounting bar via an opening 624 in the base 622. The top of the base 622 contacts a moving conveyor belt at a first location to bias the tip 630 into contact with an outer surface of the conveyor belt at a second location.

Although the invention has been described in detail with reference to a few exemplary versions, other versions are possible. So, as these few examples suggest, the scope of the claims is not meant to be limited to the versions described in detail.

What is claimed is:

1. A scraper for a conveyor belt, comprising:
   a base including a central opening for receiving a shaft and having an upper surface for contacting the conveyor belt in a first location; and
   a tapering scraper tip extending from the base, the tip contacting the conveyor belt in a second location, the tapering scraper tip including an opening for receiving and mounting a position limiter onto the shaft.

2. The scraper of claim 1, wherein the tapering scraper tip comprises a bar extending at a selected angle from the base and an end that bends upwards from the bar, the end tapering to form a scraping edge.

3. The scraper of claim 1, further comprising a counter weight coupled to the base.

4. The scraper of claim 3, further comprising an arm extending from the base for receiving the counter weight.

5. The scraper of claim 3, wherein the counter weight is integral with the base.

6. The scraper of claim 1, further comprising a position limiter mounted in the opening of the tapering scraper tip and snapped onto the shaft.

7. The scraper of claim 1, wherein the base is tubular.

8. A conveyor comprising:
   a conveyor belt trained around at least a first reversing element and a second reversing element;
   a shaft mounted below the second reversing element;
   a self-biasing scraper mounted on the shaft, the self-biasing scraper comprising a tubular base having a curved outer surface and a tapering scraper tip extending from the base, wherein a top portion of the curved outer surface contacts the outer side of the conveyor belt at a first location at about 180° from the top of the second reversing element and the tapering scraper tip contacts the outer side of the conveyor belt at a second location.

9. The conveyor of claim 8, wherein the second location is at the side of the second reversing element.

10. The conveyor of claim 8, wherein the self-biasing scraper further includes an opening in the tapering scraper tip for receiving and mounting a position limiter onto the shaft.

11. The conveyor of claim 10, further comprising a position limiter mounted to the shaft in the opening.

12. The conveyor of claim 8, wherein the self-biasing scraper further includes a counter weight for biasing the tapering scraper tip towards the second location.

13. The conveyor of claim 8, wherein the second location is about 135° from the top of the second reversing element.

14. A method of scraping debris from a conveyor belt trained around a reversing element, comprising the steps of:
   mounting a self-biasing scraper to a shaft disposed below the reversing element such that a base of the self-biasing scraper contacts the conveyor belt in a first location; and
   driving the conveyor belt such that the conveyor belt pushes against the base of the self-biasing scraper in the first location to push a tip of the self-biasing scraper into contact with the conveyor belt at a second location.

15. The method of claim 14, further comprising the step of mounting a position limiter to the shaft through openings in the self-biasing scraper.

16. A scraper for a conveyor belt, comprising:
   a base including an opening for receiving a shaft and having a curved upper surface for contacting the conveyor belt in a first location;
   a tapering scraper tip extending from the base, the tip contacting the conveyor belt in a second location; and
   an arm extending from the base substantially opposite the tapering scraper tip for mounting a counter weight to bias the tapering scraper tip into contact with the conveyor belt.

17. The scraper of claim 16, wherein the arm includes a channel for seating the counter weight.

18. The scraper of claim 17, further comprising a counter weight having a central bar seated in the channel.

19. The scraper of claim 16, wherein the base is tubular.

* * * * *